July 11, 1939.   P. W. KIMBALL   2,165,275
COMPUTING SCALE
Filed March 12, 1937

Philip W. Kimball
INVENTOR

BY W. M. Wilson
ATTORNEY

Patented July 11, 1939

2,165,275

UNITED STATES PATENT OFFICE 2,165,275

COMPUTING SCALE

Philip W. Kimball, Ashland, Mass., assignor to
International Business Machines Corporation,
New York, N. Y., a corporation of New York Application March 12, 1937, Serial No. 130,450

14 Claims. (Cl. 265—29)

This case relates to weighing scales for effecting computations of functions of applied load.

One example of such a scale is a total price scale for giving the total value of an applied load at a selected unit price. Another example is a counting scale in which a count of a previously undetermined number of pieces in an applied load is given by comparing the weight of the load with the weight of a known number of pieces. Other examples are length per unit weight scales, specific gravity determining scales, and the like.

In all such scales, the general principle is to operate the weighing mechanism in accordance with a weight factor and to correlate this factor with another factor either selected manually or by other weighing mechanism to provide a computation which is a function of the plurality of factors.

The present invention has for its main object to provide a simple scale for computing functions of weight, such as a count of pieces, total prices, or the number of pieces per unit weight.

The object is further to provide means operating according to the principles of logarithms to multiply or divide weight by another factor without requiring the weighing mechanism to move logarithmically.

Further, this object is to provide means equivalent in effect to a pair of slide rule scales to provide weight proportional computations.

The object is still further to provide logarithmic computing means which may be utilized with any ordinary scale without requiring changes in the weighing mechanism.

Other objects will appear from the following parts of the specification and from the drawing, in which.

Figure 1:
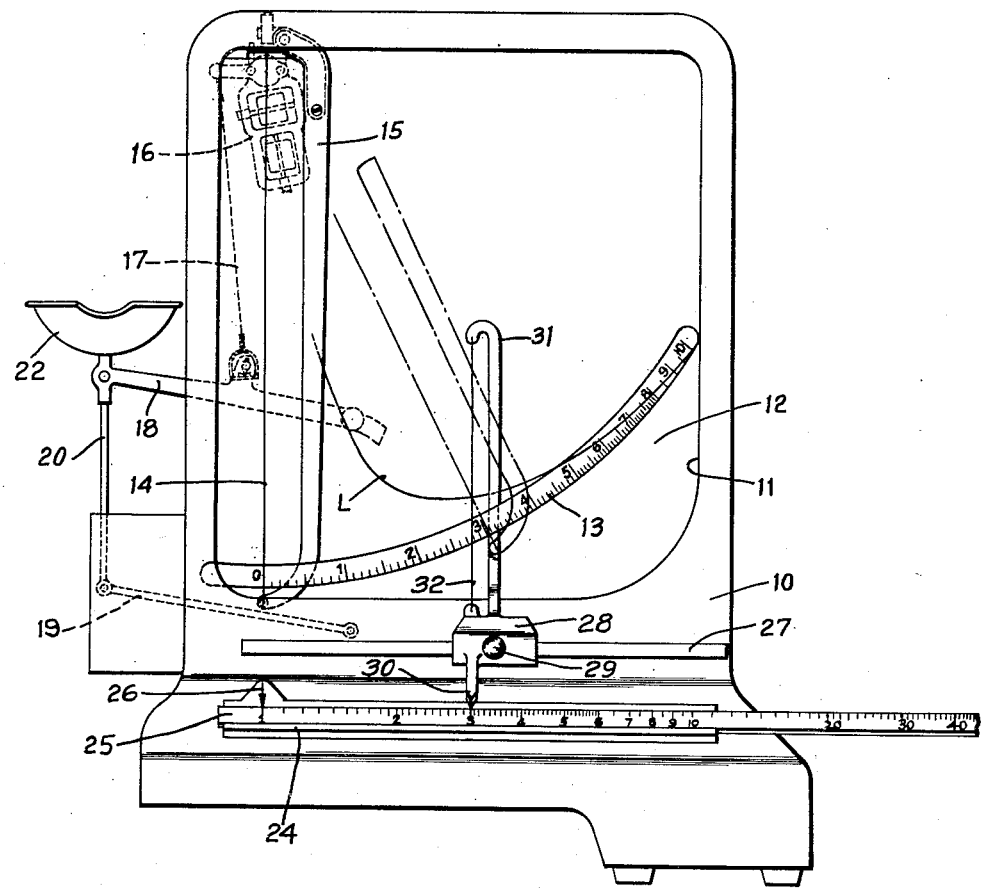
Fig. 1 is a front view of the weighing scale.
Figure 2:
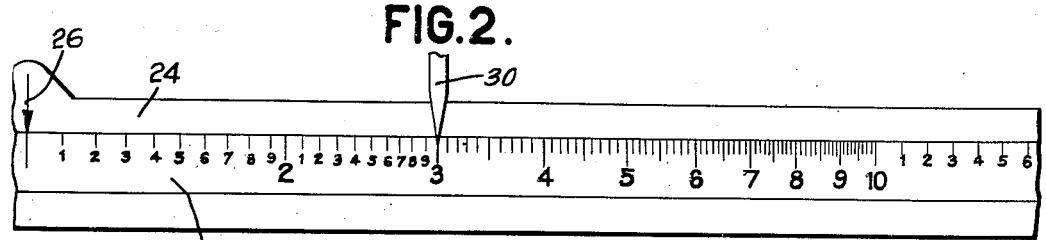
Fig. 2 is an enlarged view of the computation-indicating scale.

The present invention utilizes the logarithm principle of computations. Heretofore, it has been proposed to build a logarithm scale in which the indicating element was moved proportionately to the logarithmic equivalents of the applied load, this being accomplished through a cam shaped logarithmically. The shaping and grinding of such a cam is exceedingly difficult and the accuracy of the cam unreliable. Further, such a cam introduces complications in the connections between the applied load and the cam operating means.

The present invention utilizes the logarithm principle without requiring the indicating element to move proportionally to logarithm equivalents of the applied load and without requiring a special logarithmically shaped cam.

The principles of the present invention will now be explained in detail. For purposes of the disclosure, the invention has been applied to the small capacity weighing unit shown and described in Patent No. 1,650,227. This weighing unit comprises a frame and housing 10 having a large, substantially rectangular, sight window 11 exposing a plate 12 on which is inscribed a weight indicating scale 13. In the present instance, scale 13 has ounce indicating figures and graduations and is calibrated in tenths of ounces. The weight capacity of the illustrated weighing mechanism is ten ounces, and accordingly scale 13 is graduated from 0 to 10 ounces.

Scanning indicating scale 13 is the indicator line 14 stretched between the upper and lower legs of a substantially U-shaped member 15. Member 15 is rigidly connected at its upper end to a pendulum assembly 16, connected by a tape 17 to a lever 18. Lever 18 and a parallel, check lever 19 carry the stem 20 of load pan 22. When a load is placed in pan 22, lever 18 is depressed and through tape 17 rocks pendulum assembly 16, member 15, and indicator 14, counterclockwise. Indicator 14 takes a position proportional to the weight of the load in pan 22 and intersects the scale 13 to a point indicative of the amount of weight, in ounces, of the load.

The new mechanism will now be described.

The base of frame 10 is provided with a guideway 24 slidably mounting for horizontal movement a slide rule bar 25. Slide rule bar 25 is graduated and marked with a scale 1 to 10 followed by a repeated scale 10 to 100, the latter representing the log of 10 plus the log of a number and therefore being equivalent to a number multiplied by ten. Thus, the left hand scale may be considered as the units denominational order in relation to the tens denominational order of the right hand scale of bar 25. This process may be continued by adding a third scale marked 100 to 1000, and so on.

On guideway 24 is inscribed an arrow-shaped index 26 for indexing the graduations on slide bar 25.

Rigidly provided on frame 10 is a guide bar or track 27 slidably mounting for horizontal movement a slide 28 having a knob 29 by which it may be manipulated. An index finger 30 projecting downwardly from slide 28 coacts with the graduations of slide rule bar 25. Upwardly projecting from slide 28 is a member 31 between the upper end of which and slide 28 is stretched a vertical hair line 32 which is in vertical alinement with the indicating point of index 30.

Inscribed on plate 12 is a curve L, the points of which represent logarithmic measurements, in a horizontal direction, equivalent to the different weight positions of weight indicator 14. For example, when indicator 14 is at the 2 oz. position, it intersects curve L at a point, the horizontal distance of which from the no-load, vertical, full-line position of the indicator is equal to the logarithm of 2 using the same scale of measurement as an slide rule bar 25. Similarly, for every other weight position of indicator 14, it intersects a point of curve L, the horizontal distance of which from the no-load position of the indicator is equal to the logarithm of the weight acting on the indicator measured according to the scale selected for slide bar 25. Now, if slide 28 is moved along guide bar 27 to a position in which its hair line 32 runs through the point of intersection of the indicator 14 and curve L, then index 30 of the slide will be at a horizontal distance from the no-load position of the indicator equal to the logarithmic equivalent of the indicator position according to the scale of slide rule bar 25.

In short, slide index 30 when positioned at the intersecting point of curve L and indicator 14 projects vertically onto slide rule bar 25 the logarithmic distance proportional to the weight acting on the indicator.

For example, as shown in Fig. 1, a load of 3 ozs. is in pan 22, causing indicator 14 to take a 3 oz. position on weight scale 13. Slide 28 has been moved to a position in which its hair line 32 runs through the point of intersection of curve L and the indicator, and index of the slide points to "3" on slide rule bar 25. Thus, if the graduations on slide rule bar 25 represented weight, then the magnitude of the weight would be indicated by index 30, provided bar 25 were in the position shown with its "1" graduation at arrow 26. The illustrated position of the slide bar 25 indicates by coaction with arrow 26 a calculation of the weight when there is one unit per ounce. Suppose, however, that it were desired to indicate the number of half ounces, in which case there would be two units per oz., then slide bar 25 would be moved to the left to aline the "2" graduation thereof with arrow 26. This is the same as multiplying the reading of index 30 by two, and the index will then point to "6" on bar 25, indicating that the load in pan 22 has six half-ounce units.

The above principle is readily applicable to counting any number of like pieces in pan 22. Thus, if the number of pieces per oz. is known, the slide bar 25 is moved to aline this number with the arrow 26. The load, consisting of the undetermined number of like pieces, is placed in pan 22, causing indicator 14 to move to a position corresponding to the total weight of the number of pieces in the pan. Slide 28 is then moved to cross its hair line 32 through the intersection of the indicator 14 and curve L, and index 30 will thereby be set at a graduation on bar 25 indicating the count or number of pieces in pan 22.

This amounts to a multiplying operation in which the weight is multiplied by the number of pieces per unit weight, effected by adding the logarithm of the pieces per unit weight, represented by the distance between the "1" mark on bar 25 and the arrow 26, to the logarithm of the weight represented by the distance of index 30 from arrow 26.

Assume, for example, that the pieces to be counted average 4.8 pieces to the ounce. Slide bar 25 is set with its 4.8 graduation at arrow 26. A lot of an undetermined number of these pieces is placed in pan 22, causing the indicator 14 to swing to a position corresponding to the total weight of the lot. Slide 28 is then moved to aline its hair line with the point of intersection of indicator 14 with curve L. The number of pieces in the lot is then indicated on bar 25 by index 30. For instance, assume the total weight of the lot to be 7$\frac{1}{12}$ ounces and the number of pieces per ounce to be 4.8, then index 30 will point to 34.0 in the right hand, tens order scale of slide bar 25, indicating thereby the number of pieces in the lot. If the pieces were smaller and ran 48 pieces to the ounce, the slide bar 25 would be set the same as in the previous example, and with the same weight of 7$\frac{1}{12}$ ozs., index 30 would again point to 34.0 on the tens order scale of bar 25. The number of pieces in the lot would then be given by multiplying 34 by 10, giving 340 as the count. Thus, if the unit weight indication of slide bar 25 is multiplied by any power of ten, then the total count indication must be similarly multiplied by the same power of ten.

Thus, in the above manner, a total count is obtained by adding the logarithm of the number of pieces per unit weight to the logarithm of the total weight of the load of pieces in pan 22, and indicating the result in antilogs on slide bar 25.

To obtain the number of pieces per ounce, that is, to establish the index number of a certain kind of piece, the operator counts out a number of pieces and places the pieces in pan 22. For instance, thirty-five pieces may be counted out into the pan 22. The weight of these pieces will cause the indicator to swing proportionally to the magnitude of the weight to an angular position. The slide 28 is then adjusted so that its hair line 32 crosses the point of intersection of the indicator 14 and curve L. Slide bar 25 is then adjusted until the "35" graduation alines with index 30. The number of pieces to the ounce is then indicated on slide 25 at arrow 26. Instead of setting the slide bar 25 with its "35" mark at index 30, the slide bar may be set with its 3.5 mark at the index, and the number indicated at arrow 26 will then be multiplied by ten to give the number of pieces per ounce.

The above operation is equivalent to dividing the number of pieces by the total weight of said pieces, the quotient of which is the number of pieces per unit weight. Thus, the number of pieces is represented by the logarithm measured from the "1" graduation on bar 25 to the "number of pieces" graduation on bar 25 set at index 30; the weight is represented by the logarithm of the weight represented by the horizontal distance of slide 28 from arrow 26, and the difference in these logarithms is represented by the distance between the "1" mark on slide 25 and arrow 26. The latter then indicates, on slide 25, the number of pieces per ounce.

Instead of obtaining counts or number of pieces, the apparatus may be used to compute total prices of articles in pan 22. Thus, if the article in pan 22 weighs 3 ozs. and the unit price of the article is 1 cent per ounce, the slide index 30 indicates a total price of 3 cents on bar 25. If the unit price were any other number, the bar 25 would be moved to the left until the unit price were alined with arrow 26, and index 30 would indicate total price on bar 25. This operation of bar 25 to aline the unit price with arrow 26 adds the logarithm of the unit price to the logarithm of the weight which is equivalent to multiplying the total weight by the unit price to obtain the total cost.

In all of the above operations, the weight scale 13 is unnecessary, and is used only to indicate the total weight of the articles in pan 22, without entering into the computing operations.

It is clear that the capacity or form of the weighing mechanism, the particular unit of weight, or the significance of the graduations on bar 25 may be varied without departing from the principles of the invention.

While the invention has been disclosed in the illustrated and described form, it is understood that variations, departures, and changes in the form and details thereof may be made within the principles of the invention. I therefore wish to be limited only as indicated by the following claims.

I claim:

1. A computing scale for computing a result which is a function of weight; comprising a device having a straight line element and movable variable distances in response to weight acting on the scale, means, relative to which the straight line element is movable, for coacting with different points of said element along its length for obtaining the logarithmic equivalents of the distances through which the device moves for the different weights acting on the scale, and means acting in conjunction with the point of coaction of the element and the first-named means for manifesting a result which is a function of the logarithmic equivalent of the active weight.

2. A computing scale for computing a result which is a function of weight; comprising an elongated straight line element movable in response to weight acting on the scale, a logarithmic curve, relative to which the straight line element is movable for intersecting different points along the length of said element depending on the extent of movement of the element and the distances of which from a datum line represent logarithmic equivalents of the weights acting on the scale, and means acting in conjunction with an intersected point of said element and logarithmic curve for manifesting a result which is a function of the active weight.

3. A computing scale for computing a result which is a function of weight; comprising weighing mechanism, a pivoted straight line element movable to different positions, angular to a datum line, by the weighing mechanism in accordance with weight acting on the mechanism, a logarithmic curve, relative to which the element is movable, for intersecting a different point of said element in each different angular position of said element, the intersected points being at distances from the datum line representing logarithmic equivalents of different weights when acting on the weighing mechanism, and means acting in conjunction with the intersected point of said element and logarithmic curve for manifesting a result which is a function of the weight corresponding to the latter point.

4. A computing scale for computing a result which is a function of a plurality of variables, one of which is applied weight; comprising weighing mechanism responsive to the applied weight, an element movable by the weighing mechanism in accordance with the applied weight, a logarithmic curve, relative to which the element is moved by the weighing mechanism, for intersecting different points of said element, the distances of which from a datum line correspond to the logarithm equivalents of different weights when applied to the scale, and a settable logarithmically graduated device acting in conjunction with the intersected point of the element and logarithmic curve corresponding to the applied weight for manifesting a result which is a function of the applied weight and of the setting of the device.

5. A computing scale for computing a result which is a function of weight; comprising a logarithmic curve, the points of which logarithmically represent amounts of weight, means responsive to weight acting on the scale for moving relative to the curve for selecting a point of said curve representative of the active weight, and means acting in conjunction with said selected point of the curve for manifesting a result which is a function of the active weight.

6. A computing scale for computing a result which is a function of applied weight; comprising a settable member, a logarithmic curve representing weight magnitudes, an element moved, relative to the curve, in response to the weight applied to the scale for intersecting a point of the curve representative of the magnitude of the applied weight, and means for coordinating the intersected point with said member to provide a manifestation of a result which is a function of the applied weight and of the setting of the member.

7. A computing scale for computing a result which is a function of applied weight; comprising a settable member, a fixed graph curve representative of weight magnitudes, an element movable in response to the applied weight to select a point of said curve representative of the magnitude of applied weight, and means for correlating the selected point of said graph curve with said settable member for providing a manifestation of a result which is a function of the applied weight and of the setting of said member.

8. A computing scale for computing a result which is a function of applied weight; comprising a stationary logarithmic curve representing amounts of weight, a straight edge element responsive to weight applied to the scale for selecting a point of said curve representing the amount of applied weight, and means acting in conjunction with the selected point of the curve for manifesting a result which is a function of the applied weight represented by the selected point of the aforesaid curve.

9. A computing scale for computing a result which is a function of applied weight; comprising a fixed logarithmic curve logarithmically representing amounts of applied weight, means responsive to weight applied to the scale for selecting a point of said curve logarithmically representing the applied weight, and means acting in conjunction with said selected point of the curve for manifesting a result which is a function of the applied weight.

10. A computing scale for computing a result which is a function of applied load; comprising a stationary logarithmic curve logarithmically representing amounts of applied load, means responsive to weight applied to the scale for intersecting a point of said curve representing logarithmically the applied weight, and logarithmic means acting in conjunction with the intersected point of said curve for manifesting a result which is a function of the applied load.

11. A computing scale for computing a result which is a function of applied weight; comprising a graduated indicating member, a fixed logarithmic curve representing weight quantities, an element responsive to weight applied to the scale for intersecting a point of said curve representative of the applied weight, and means for correlating the intersected point of the curve with said indicating member to cause the latter to indicate a result which is a function of the applied weight.

12. The scale as defined in claim 11, said correlating means comprising an adjustable element movable into coaction with an intersected point of said curve to correlate said point with the indicating member.

13. A computing scale for computing a result which is a function of two factors, one of which is weight; comprising a pivoted straight edge element movable through different angles in response to different weights applied to the scale, a fixed logarithmic curve for intersecting different points along the length of said element depending on the angle of said edge and located at logarithmic distances from a datum line corresponding to different weights acting on the element, a logarithmically graduated device settable in accordance with the factor other than applied weight, means for coordinating the intersected point of the element with the device to indicate thereon a result which is a function of the weight factor corresponding to the intersected point and of the other factor according to which the device is set, and means for indicating the latter factor on said device.

14. A scale; comprising a load receiver, weighing mechanism connected to the load receiver to respond to the effective weight of the load in the receiver, a pivoted hair line movable through different angles by the weighing mechanism in accordance with the aforesaid weight, a fixed logarithmic curve for intersecting different points along the length of said hair line depending on the angles of the line and which are at different logarithmic distances from a datum line corresponding to different weights, and a settable logarithmically graduated slide acting in conjunction with the point of said hair line intersected by the curve for indicating a result which is a function of the effective weight and the setting of the slide.

PHILIP W. KIMBALL.